April 22, 1952

G. POTSTADA 2,593,603

PRUNING SHEARS

Filed Aug. 11, 1947

INVENTOR
George Potstada, deceased
BY Magdalena Potstada, Administratrix

BY Mellin and Hanscom
ATTORNEYS

Patented Apr. 22, 1952

2,593,603

UNITED STATES PATENT OFFICE 2,593,603

PRUNING SHEARS

George Potstada, deceased, late of Oakland, Calif., by Magdalena Potstada, administratrix, Oakland, Calif.

Application August 11, 1947, Serial No. 767,940

1 Claim. (Cl. 30—190)

This invention relates to pruning shears.

The present application is a continuation-in-part of the application of George Potstada, deceased, for "Pruning Shears," Serial No. 571,325, filed January 4, 1945, and now abandoned.

It is the principal object of the present invention to generally improve the construction and operation of pruning shears whereby to provide pruning shears which are inexpensive to produce and which will efficiently operate with a minimum of effort.

In practicing the invention an elongated tubular member is provided having a fixed blade secured at one end and a fixed grip member secured at the opposite end. A pivotal blade is pivoted to the fixed blade for shearing cooperation therewith and a movable grip member is pivoted to the fixed grip member. A connector extends through the tubular member and is connected at one end of the movable blade and at the other end to the movable grip member so that operation of the latter will be accompanied by operation of the former. The formation of the blades and the pivotal arrangement is such that a draw cutting action results. Further, the pivotal arrangement of the blade and the grip and the disposition of the points of connection between those parts are such that the leverage obtained enables great ease of operation.

Figure 1:
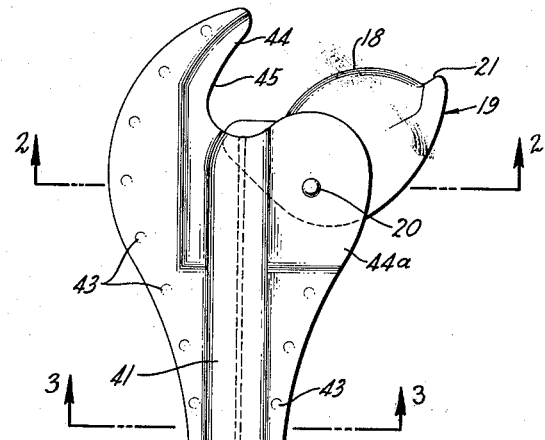

One form which the invention may assume is exemplified in the following description and illustrated by way of example in the accompanying drawings, in which:

Fig. 1 is a side elevation of a modified form of pruning shears.

Figure 2:
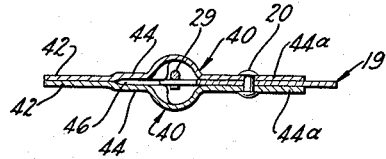
Figure 3:
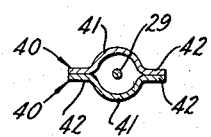
Figure 4:
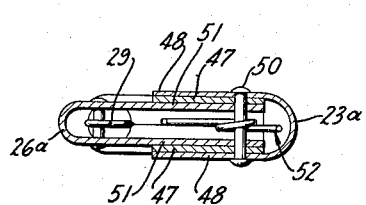

Figs. 2, 3 and 4 are transverse sections taken along the lines 2—2, 3—3 and 4—4 respectively of Fig. 1.

Essentially, the pruning shears disclosed in Figs. 1 to 4, inclusive, consist of a main elongate body portion formed of two one-piece body members 40 disposed symmetrically of a longitudinal plane and oppositely arranged to one another. Each member consists of an elongated central half-tubular portion 41 and side flanges 42 extending outwardly therefrom. Upon placing the members 40 against one another with their flanges abutting 42, they can be integrated to one another by spot welding at suitable points 43 along the lengths of the flanges.

The upper portions of the body members 40 are formed as spaced fixed blades 44, having hook-shaped concave cutting edges 45 and provide a recess 46 into which the cutting edge 18 of the movable blade 19 may be received. The recess is disposed on one side of a central longitudinal plane extending through the body substantially at right angles to the flanges 42. The portion 44a of the fixed blades 44 on the other side of the plane just mentioned are also spaced apart for the reception of the movable blade 19, which is mounted on a pivot pin 20 secured to the spaced portions 44a.

The lower portions of the body members 40 are offset from the central plane on the same side of the body as the movable blade 19 to provide spaced depending legs 47, around and against which are disposed the bifurcated arms 48 of a generally U-shaped one-piece gripping member 23a, the arms 48 being integrated to the legs by spot welding 49 or any other suitable means. A pivot pin 50 extends through the arms of the fixed gripping member 23a and the legs 47 to provide a pivotal mounting for an L-shaped, one-piece movable gripping member 26a having inwardly extending bifurcated arms 51 mounted on the pivot pin 50 within the legs 47, with the long leg of the gripping member 26a disposed on the same side of the aforementioned central plane as the fixed blades 44. This movable gripping member is connected to the movable blade 19 by a wire connector 29 extending through the tubular portion 41 of the body.

A spring is incorporated in the device, consisting of spring wire 52 coiled around the pivot pin 50, with one end 53 bearing against the handle portion of the fixed grip member 23a and its other end 54 against the handle portion of the movable grip member 26a, the spring urging the latter member outwardly and the wire connector 29 upwardly, in order to urge the movable cutting blade 19 away from the cutting edges 45 of the fixed blades 44.

It is apparent that the device disclosed in Figs. 1 to 4, inclusive, has few parts, and that it may be assembled in a rapid fashion to form a strong, although light, device.

It is seen from the description and from the drawing that the present pruning shears are adapted to quantity production methods in that practically all of the parts thereof are stampings and can be constructed on a punch press. Thus, the shears can be very inexpensively produced and assembled.

It is also desired to point out that because of the leverage obtained, branches and twigs can be severed with much less effort than that necessary to operate pruning shears in which two levers of the first class are pivotally connected, as in ordinary practice.

While preferred form of the invention is shown, it is to be understood that various changes may be made in its construction by those skilled in the art without departing from the spirit of the invention as defined in the appended claim.

Having thus described the invention, what is claimed and desired to secure by Letters Patent is:

Pruning shears of the character described comprising an elongated body portion formed of two one-piece body members disposed symmetrically of a longitudinal plane and oppositely arranged one to another, each member formed to include an elongated central half-tubular portion and side flanges extending outwardly therefrom, the flanges of the said members abutting and fastened to each other to form the body portion, the side flanges at one side and at one end of the body portion being formed with a concaved hook portion projecting beyond the end of the half-tubular portions, a pivotal blade supported between the flanges of said body members opposite the hook portion and pivoted therebetween at a point eccentric to the axes of the half-tubular portions and on an axis at right angles to the axes of the said half-tubular portions, the adjacent edges of said blade and said hook portion being formed with complemental cutting edges, a fixed hand grip fixed to the end of the body portion opposite said blade, a hand grip pivotally secured to said fixed hand grip on an axis parallel to the axis of pivotal movement of the pivotal blade, the pivotal point of the hand grip being laterally offset with respect to the half-tubular portions of the body members, a connecting member extending substantially axially through said half-tubular portion and connected at one end to the pivotal blade at a point eccentric to its pivotal point, the other end being connected to the pivotal hand grip at a point eccentric to its pivotal point whereby movement of the hand grip toward and away from the fixed hand grip will cause operation of the pivotal blade for cutting purposes.

MAGDALENA POTSTADA,
*Administratrix of the Estate of George Potstada, Deceased.*

REFERENCES CITED

The following references are of record in the file of this patent:

UNITED STATES PATENTS

| Number | Name | Date |
|---|---|---|
| 58,326 | Waters | Sept. 25, 1866 |
| 96,294 | Woodworth | Oct. 26, 1869 |
| 593,337 | Smith | Nov. 9, 1897 |

FOREIGN PATENTS

| Number | Country | Date |
|---|---|---|
| 326,658 | Great Britain | Mar. 20, 1930 |